US011356722B2

(12) United States Patent
Vieron et al.

(10) Patent No.: US 11,356,722 B2
(45) Date of Patent: Jun. 7, 2022

(54) SYSTEM FOR DISTRIBUTING AN AUDIOVISUAL CONTENT

(71) Applicant: QUORTEX, Cesson Sevigne (FR)

(72) Inventors: Jérôme Vieron, Cesson Sevigne (FR); Thierry Trolez, Cesson Sevigne (FR); Marc Baillavoine, Cesson Sevigne (FR); Julien Villeret, Cesson Sevigne (FR)

(73) Assignee: QUORTEX, Cesson-Sevigne (FR)

( * ) Notice: Subject to any disclaimer, the term of this patent is extended or adjusted under 35 U.S.C. 154(b) by 70 days.

(21) Appl. No.: 16/922,518

(22) Filed: Jul. 7, 2020

(65) Prior Publication Data

US 2021/0014547 A1    Jan. 14, 2021

(30) Foreign Application Priority Data

Jul. 9, 2019   (FR) ...................... 1907690

(51) Int. Cl.
*H04N 21/24* (2011.01)
*H04N 21/2187* (2011.01)
(Continued)

(52) U.S. Cl.
CPC ..... *H04N 21/2405* (2013.01); *H04N 21/2187* (2013.01); *H04N 21/23103* (2013.01); *G06N 3/049* (2013.01); *G06N 3/0454* (2013.01)

(58) Field of Classification Search
CPC .......... H04N 21/2405; H04N 21/2187; H04N 21/23103; G06N 3/049; G06N 3/0454
See application file for complete search history.

(56) References Cited

U.S. PATENT DOCUMENTS

| 10,496,924 B1* | 12/2019 | Highnam ............ H04L 63/1433 |
| 2012/0250755 A1* | 10/2012 | Ratner ................. H04N 19/436 |
| | | 375/240.01 |

(Continued)

FOREIGN PATENT DOCUMENTS

CN          111049615 A  *  4/2020  ............. H04B 1/711

OTHER PUBLICATIONS

Deneke et al.; "Video Transcoding Time Prediction for Proactive Load Balancing"; 2014 IEEE International Conference on Multimedia and Expo (ICME); Jul. 2014; pp. 1-6.

(Continued)

*Primary Examiner* — James R Sheleheda
(74) *Attorney, Agent, or Firm* — Oliff PLC; R. Brian Drozd

(57) ABSTRACT

An elementary module of a workflow of an audiovisual content distribution system, each content being received by a terminal in the form of a succession of segments, each segment being distributed to the terminal following transmission of a request by terminal and being obtained by an application of a workflow to a portion of content. The elementary module executes a processing of a predefined type and comprises: a variable plurality of processing units available for executing said processing; a scaling module, able to determine, using a first model, a number of processing units to be allocated for an implementation of a set of processing operations requested of said elementary module; and a load management module able to choose, using a second model, for each processing operation requested, one processing unit among processing units allocated by the scaling module for performing processing, each model being a neural network of the deep learning type.

10 Claims, 8 Drawing Sheets

(51) Int. Cl.
*H04N 21/231* (2011.01)
*G06N 3/04* (2006.01)

(56) References Cited

U.S. PATENT DOCUMENTS

| | | | |
|---|---|---|---|
| 2013/0104177 A1* | 4/2013 | Kwan | H04N 21/234 |
| | | | 725/93 |
| 2016/0219286 A1* | 7/2016 | Gadepalli | H04N 19/184 |
| 2017/0078376 A1* | 3/2017 | Coward | H04N 19/436 |
| 2019/0188848 A1* | 6/2019 | Madani | G16H 10/60 |
| 2020/0210809 A1* | 7/2020 | Kaizerman | G06N 3/0454 |
| 2020/0344497 A1* | 10/2020 | Qin | H04L 65/607 |

OTHER PUBLICATIONS

Sethurama et al.; "Noniterative Content-Adaptive Distributed Encoding Through ML Techniques"; SMPTE Motion Imaging Journal; Oct. 2018; vol. 127; No. 9; pp. 50-55.

* cited by examiner

SYSTEM FOR DISTRIBUTING AN AUDIOVISUAL CONTENT

TECHNICAL FIELD

The present invention relates to a system for distributing audiovisual contents and a method executed by said system.

PRIOR ART

The world of television distribution is subject to great change. Whereas for a long time each user was content with live broadcasting of the audiovisual programs on his television set, the methods for consuming audiovisual programs have fundamentally changed. Thus a user now wishes to be able to look at an audiovisual program that he has chosen anywhere and at any time. These new consumption methods have been made possible by the appearance of new evermore powerful roaming terminals and by a great increase in network infrastructures.

In parallel with this change, a new audiovisual broadcasting service, referred to as OTT (Over-The-Top) has appeared. An OTT service is a service for distributing audiovisual contents over a network wherein the operator of said network (i.e. a cable, telephone or satellite company) plays merely a role of transporter of said contents. In an OTT service, the operator of the network has no control over the contents, that is to say he is neither responsible for nor in a position to control the display of said contents, compliance with copyright and/or redistribution of said contents. OTT services are operated on so-called non-managed networks, that is to say with a bandwidth and quality of service (QoS) that are not guaranteed.

In order to address these new services, various protocols have been developed: Apple HLS (HTTP (Hypertext Transfer Protocol) Live Streaming), Microsoft Smooth Streaming (MSS), Adobe HTTP Dynamic Streaming (HDS), and MPEG Dynamic Adaptive Streaming over HTTP (MPEG-DASH). All these protocols are based on an HTTP-based adaptive transmission concept (HTTP Adaptive Streaming (HAS)). The HAS concept is based on the following functioning:

- each content is encoded in the form of a bitstream in accordance with a plurality of profiles, using various codecs, various resolutions and various bitrates. This plurality of profiles makes it possible to address terminals (or applications functioning on terminals) having different capabilities (codecs supported, screen resolution, decoding power) and to adapt the contents to the variations in bandwidth on the network.
- Each bitstream is next divided into segments, referred to as chunks, of a few seconds according to a format dependent on the protocol to be supported. For each content, a file, called a manifest, indicating the characteristics of each profile and the corresponding segments, is created. When a plurality of protocols must be supported, a version of each segment is created for each protocol.
- The manifests and the corresponding segments are stored on servers forming content delivery networks (CDNs), simply called CDNs hereinafter. The CDNs provide cache capacities in the network, which makes it possible to improve the QoS, in particular in terms of access times and latency.
- A terminal wishing to play a content sends requests to a CDN. Each request asks for a segment and specifies the profile of the segment requested. It is therefore the terminal that fixes the profile requested.

A content can therefore be stored in a large number of versions according to the number of profiles and protocols that have to be supported. A system of the HAS type is therefore very greedy in terms of volume of data to be stored.

FIG. 1 depicts schematically an example of a channel 1 for broadcasting audiovisual programs.

The broadcasting channel 1 comprises a source 100, a block called OTT headend 10, a server, referred to as the original server, 111, and a plurality of CDNs 112A, 112B, 112C and 112D connected to terminals 114A, 114B by means of an internet network 113.

The source 100 supplies original content to the OTT headend 10. In the example in FIG. 1, this content is encoded in the form of a bitstream comprising a video substream, at least one audio substream and at least one subtitle substream.

The OTT headend 10 is responsible for preparing the content in versions in accordance with requirements of terminals that could request this content. The OTT headend 10 comprises a plurality of modules, each module being able to be a physical module (hardware) or software. In the OTT headend 10, the bitstream is received by a video decoder 101 (or respectively an audio decoder 102 or a subtitle decoder 103) that manages a decoded video stream (or respectively at least one decoded audio stream, or at least one decoded subtitle stream).

The decoded video stream is supplied to two image processing modules 104A and 104B that generate processed video streams. The image processing module 104A is for example a noise-reducing filtering module. The image processing module 104B is for example a contour-enhancing module.

Each video stream processed is supplied to two video encoders 107A and 107B. The video encoder 107A is for example an encoder in accordance with the AVC standard (H.264/AVC (ISO/IEC 14496-10-MPEG-4 Part 10, Advanced Video Coding/ITU-T H.264). The encoder 107B is for example an encoder in accordance with the HEVC standard (ISO/IEC 23008-2-MPEG-H Part 2, High Efficiency Video Coding/ITU-T H.265).

Each decoded audio stream is supplied to two audio processing modules 105A and 105B that generate processed audio streams. The audio processing module 105A is for example a noise-reducing filtering module. The image processing module 105B is for example a voice enhancement module.

Each audio stream processed is supplied to two audio encoders 108A and 108B. The audio encoder 108A is for example an encoder in accordance with the AAC standard (Advanced Audio Coding, ISO/IEC 13818-7). The encoder 107B is for example an encoder in accordance with the MP3 standard (MPEG-1/2 Audio Layer 3).

Each decoded subtitle stream is supplied to a subtitle processing module 106 that generates processed subtitle streams. The subtitle processing module 106 is for example a filtering module replacing certain words with others according to regional linguistic usages.

Each processed subtitle stream is supplied to a subtitle format conversion module.

Each video stream issuing from the video encoders 107A and 107B, each audio stream issuing from the audio encoders 108A and 108B and each subtitle stream issuing from the conversion module 109 are transmitted to a packetiser module 110. The packetiser module 110 forms segments in accordance with the protocol or protocols to be supported. Each segment is next transmitted to an original server 111, which is responsible for transmitting these segments to the CDNs 112A, 112B, 112C and 112D. Each terminal 114A (or 114B) wishing to play the content, requests the content of a CDN segment by segment, changing the profile if necessary from one segment to another.

In the example in FIG. 1, from a content, the OTT headend 10 has generated, supposing that two protocols of the HAS type must be supported, around thirty different versions of the content. The segments corresponding to each version are stored on each CDN.

A concept substantially different from the HAS concept, referred to as JIT (just in time), makes it possible to reduce the number of versions to be stored. An application of the JIT concept to the OTT headend 10 would consist of not routinely using all the modules in said block. For example, the OTT headend 10 could stop at the decodings, that is to say at the video decoding by the video decoder 101, at the audio decoding by the audio decoder 102 and at the subtitle decoding by the subtitle decoder 103. Next, on request, according to the requirements of the terminal that sent the request, the OTT headend 10 activates certain modules.

The JIT concept may concern various stages in an audiovisual content distribution channel. For example, the JIT concept may be applied to a processing stage (image processing, audio processing, subtitle processing) and/or to an encoding stage (video or audio) and/or to a packetising stage. Thus, for example, a packetising stage may form only segments in accordance with a single protocol. Another application of the JIT concept consists of generating a single version of a content (a single video or audio processing, a single video encoding, a single audio encoding, a single protocol) referred to as a pivot version, and then generating other versions on request from the pivot version, for example by transcoding.

An important limitation of the HAS and JIT concepts is that they involve audiovisual content distribution systems, referred to as HAS-type systems or JIT-type systems, that are monolithic and static. Thus these systems have been sized once and for all in order to process a maximum predefined number of audiovisual contents in parallel. These systems cannot go beyond this predefined number. Moreover, the relationships between the various processing modules in these systems are fixed. Each module is thus connected statically with the module that gives it data and the module to which it gives data. Thus, whatever the content and whatever the moment, in order to generate a version of a content according to a given profile, the same modules are systematically instantiated and the same predefined workflow is systematically applied.

The monolithic and static aspect means that the workflows are rigid and therefore not very open to change. Thus it is very difficult to integrate new functionalities or to replace functionalities in an existing workflow. At best action on the OTT headend to reconfigure it and at worst a replacement of the OTT headend are necessary.

Architectures of the microservices type in theory make it possible to make the workflows flexible. An architecture of the microservices type is a software architecture in which a complex application or processing is broken down into several independent and weakly coupled processes referred to as microservices. Each microservice usually specializes in a single task. The microservices communicate with each other using APIs (application programming interfaces) such as the REST (representational state transfer) APIs. One declared advantage of an architecture of the microservices type is that, if there is a requirement for an increase in resources for carrying out processing, only the microservice or microservices involved in this processing have to be scaled. However, these architectures are still difficult to implement. In addition, they are implemented in systems that are themselves pre-sized. Consequently, although in theory scaling is possible if needed, in reality it is not possible to go beyond the capacities of the system implementing them. Moreover, supposing that this problem of limit of capacity is solved, methods for effectively managing the scalings and load balancings still have to be defined. These methods must make it possible to balance the load of implementing microservices between resources that are already available but also to determine when and how to perform the scaling, i.e. when to increase or decrease the resources.

It is desirable to overcome these drawbacks of the prior art. It is in particular desirable to overcome these drawbacks of the prior art. It is in particular desirable to propose a solution for achieving audiovisual content distribution systems that are non-static and non-monolithic, and are easily scalable if needed. Moreover, this solution should make it possible to obtain a system that is very agile in terms of modification or addition of new functionalities. In addition, this system must be able to automatically manage the problems of load balancing and scaling.

DISCLOSURE OF THE INVENTION

According to a first aspect of the invention, the invention relates to an elementary module intended to be used in at least one workflow of a system making it possible to distribute audiovisual contents stored or produced live by sources to display terminals, each content being received by a terminal in the form of a succession of consecutive files, referred to as segments, each segment being distributed to a terminal following a transmission of a request by said terminal and being obtained by an application of a workflow to a portion of a content, the elementary module executing a predefined type of processing of the workflow. The elementary module comprises: a variable plurality of processing units available for executing the processing of the predefined type, the elementary module regularly obtaining information representing each processing unit added or removed in the plurality, each processing unit not keeping any information concerning a processing once the processing has been performed; a module, referred to as a central module, comprising a communication module able to receive requests for first data, each request comprising information representing a workflow to be applied to a portion of a content corresponding to a segment requested in a request by a terminal in order to obtain said first data and information representing configuration parameters to be applied to at least one processing unit of said elementary module in order to generate the first data, each processing unit taking into account the information representing the configuration parameters included in a request for first data for performing a processing corresponding to said request for first data; able to transmit a request for second data to a unit preceding the elementary module in the workflow determined from the information representing the workflow, said second data corresponding to said portion processed or not by one or more units preceding the elementary module in the workflow; and able to transmit first data when they are available to a unit that sent a request for said first data; a scaling module, able to determine a number of processing units to be allocated for implementation of a set of processing operations requested of the elementary module in requests for first data, the determination of said number relying on a scaling model corresponding to the processing of the predefined type supplied by a modelling module included in said system; and a load balancing module able to choose, for each request received, at least one processing unit from among the processing units allocated by the scaling module for processing second data in order to obtain first data requested and launching the processing of the predefined type by each processing unit chosen, the choice of the processing units relying on a load balancing model supplied by said modelling module; each model being a neural network of the deep learning type, trained by the modelling module during the functioning of said system from metrics obtained by a metrics aggregation module included in said system that were supplied by each elementary module of said system executing the processing of the predefined type, said metrics representing a functioning of each elementary module of said system executing the processing of the predefined type.

According to one embodiment, each model is a hybrid neural network wherein a neural network of the convolutional neural network type, referred to as a CNN neural network, is followed by a neural network of the long short-term memory type, referred to as an LSTM neural network, and then a neural network of the multilayer perceptron type, referred to as an MLP neural network.

According to a second aspect of the invention, the invention relates to a system for distributing audiovisual contents stored or produced live by sources to display terminals, each content being received by a terminal in the form of a succession of consecutive files, referred to a segment, each segment being distributed to a terminal following a transmission of a request by said terminal and being obtained by an application of a workflow to a portion of a content. Said system is such that at least one workflow implemented by the distribution system comprises at least one elementary module according to the first aspect able to perform a processing of a predefined type of processing, and said system further comprises: a metrics aggregation module responsible for regularly obtaining metrics of each of the elementary modules of said system and, for each predefined type of processing, aggregating the metrics obtained of each processing module of said system implementing said predefined processing type; and a modelling module recovering the metrics specific to each predefined type of processing supplied by the metrics aggregation module and, from these metrics, defining, for each of said predefined type of processing, a scaling model and a load balancing model specific to said predefined type of processing.

According to one embodiment, the definition by training the scaling and load balancing models is performed asynchronously with respect to the functioning of each workflow comprising at least one elementary module used by said system.

According to a third aspect of the invention, the invention relates to a processing method executed by an elementary module executing a predefined type of processing in at least one workflow in a system for distributing audiovisual contents stored or produced live by sources to display terminals, each content distribution taking place in the form of files, referred to as segments, each segment distributed to a terminal having been the subject of a request transmitted by said terminal and resulting from an application of a workflow to a content portion asked for by the request. The method comprises: receiving at least one request for first data, each request comprising information representing a workflow to be applied to a portion of a content corresponding to a segment asked for in a request by a terminal in order to obtain said first data and information representing configuration parameters to be applied to at least one processing unit for generating the first data; for each of said requests, extracting the information representing the configuration parameters contained in said request and transmitting a request for second data to a source or to a unit preceding the elementary module in the workflow determined from the information representing the workflow, said second data corresponding to said portion processed or not by one or more units preceding the elementary module in the workflow; determining a number of processing units to be allocated for executing each processing asked for in each request for first data received using a scaling model corresponding to the processing of the predefined type supplied by a modelling module included in said system, each processing unit belonging to a plurality of processing units available for executing the processing of the predefined type, the elementary module regularly obtaining information representing each processing unit added to or removed from said plurality, and allocating or deallocating available processing units by taking into account a number of processing units already allocated available; choosing, for each request, at least one processing unit among the processing units allocated using a load balancing model supplied by the modelling module and activating each processing unit chosen so that it applies the predefined type of processing on the second data on reception of the second data, each processing unit taking into account the information representing the configuration parameters corresponding to the processing that it must execute, each model being a neural network of the deep learning type, trained by the modelling module during the functioning of said system from metrics obtained by a metrics aggregation module included in said system supplied by each elementary module of said system executing the processing of the predefined type, said metrics representing a functioning of each elementary module of said system executing the processing of the predefined type; and, for each request, transmitting the first data when they are available to a unit that sent the request for said first data; each processing unit not keeping any information concerning a processing once the processing has been performed.

According to one embodiment, the training of the scaling and load balancing models is performed asynchronously with respect to the functioning of each workflow comprising the elementary module.

According to one embodiment, the training of each model uses a set of characteristics taking the form of a parameter vector, some parameters being themselves vectors.

According to one embodiment, the set of characteristics used for the training of the scaling model comprises characteristics making it possible to adjust parameters of said model in order to achieve an objective of avoiding overload of the processing units allocated.

According to a fourth aspect of the invention, the invention relates to a computer program product comprising instructions for implementing, by a device, the method according to the third aspect by a processor of the device.

According to a fifth aspect of the invention, the invention relates to storage means storing a computer program comprising instructions for implementing, by a device, the method according to the third aspect when said program is executed by a processor of said device.

BRIEF DESCRIPTION OF THE DRAWINGS

The features of the invention mentioned above, as well as others, will emerge more clearly from the reading of the following description of an example embodiment, said description being given in relation to the accompanying drawings, among which.

DETAILED DISCLOSURE OF EMBODIMENTS

Figure 1:
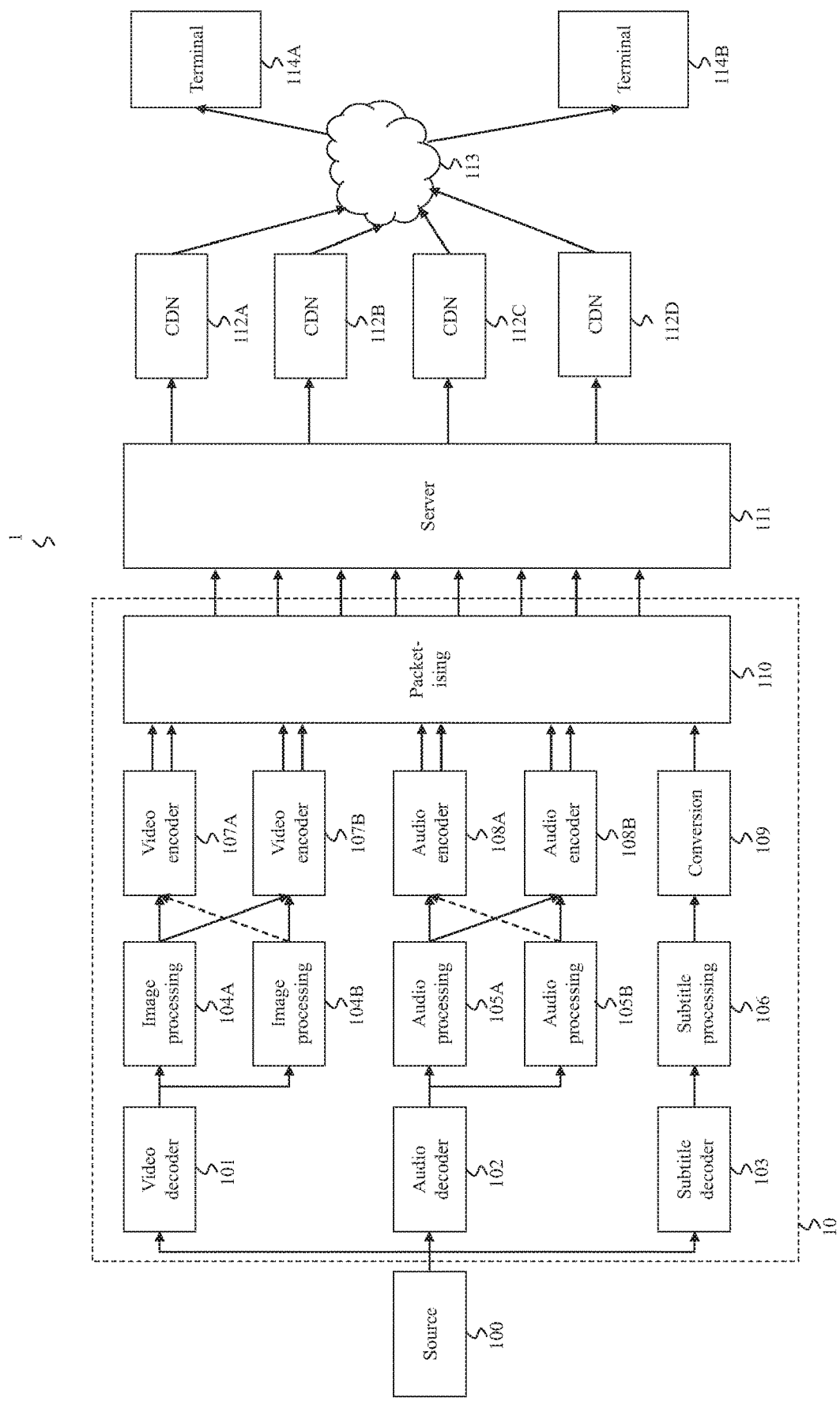
FIG. 1 describes a system for distributing conventional audiovisual contents.
Figure 2A:
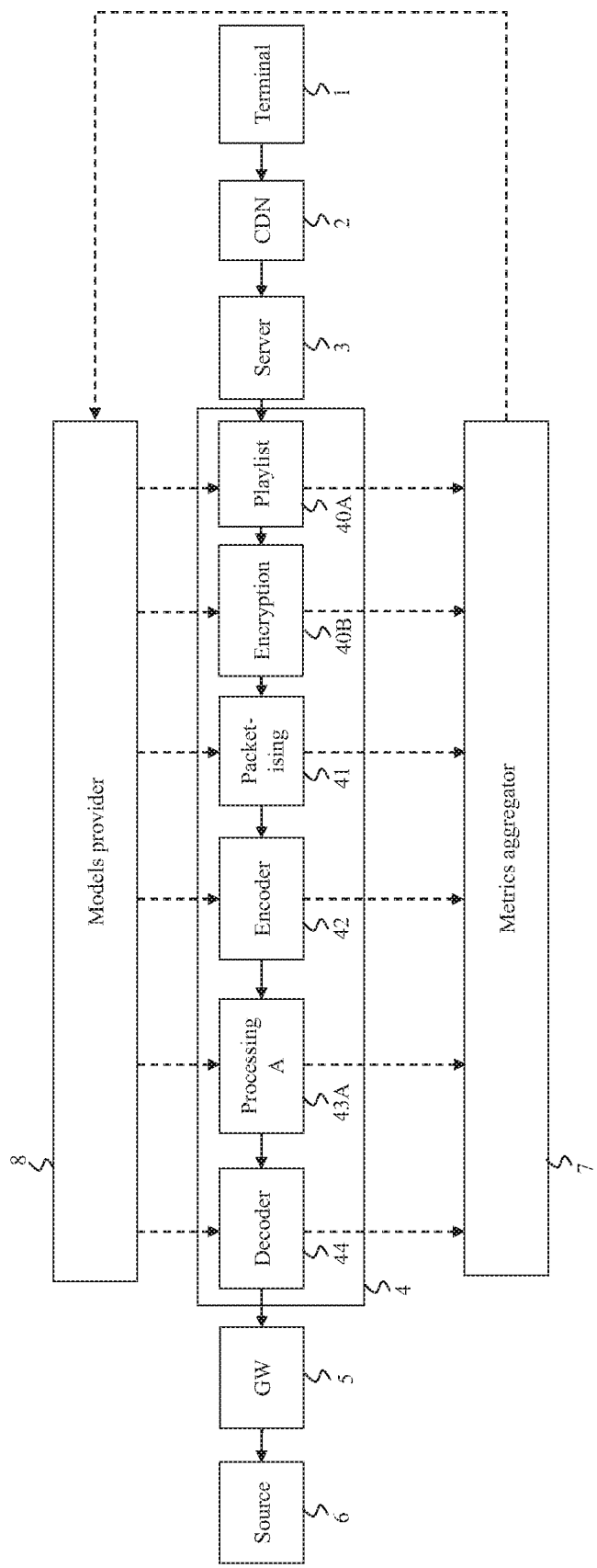
FIG. 2A describes a system for distributing audiovisual contents at a first instant during the distribution.
Figure 2B:
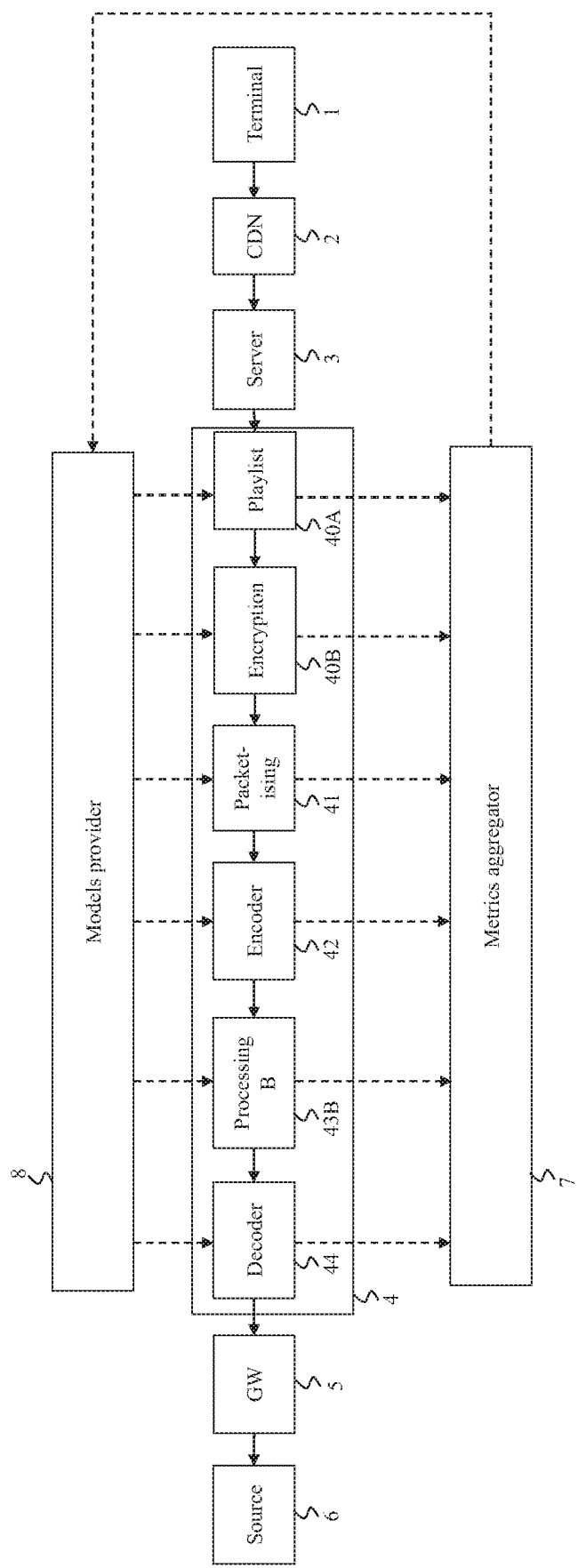
FIG. 2B describes a system for distributing audiovisual contents at a second instant during the distribution.
Figure 2C:
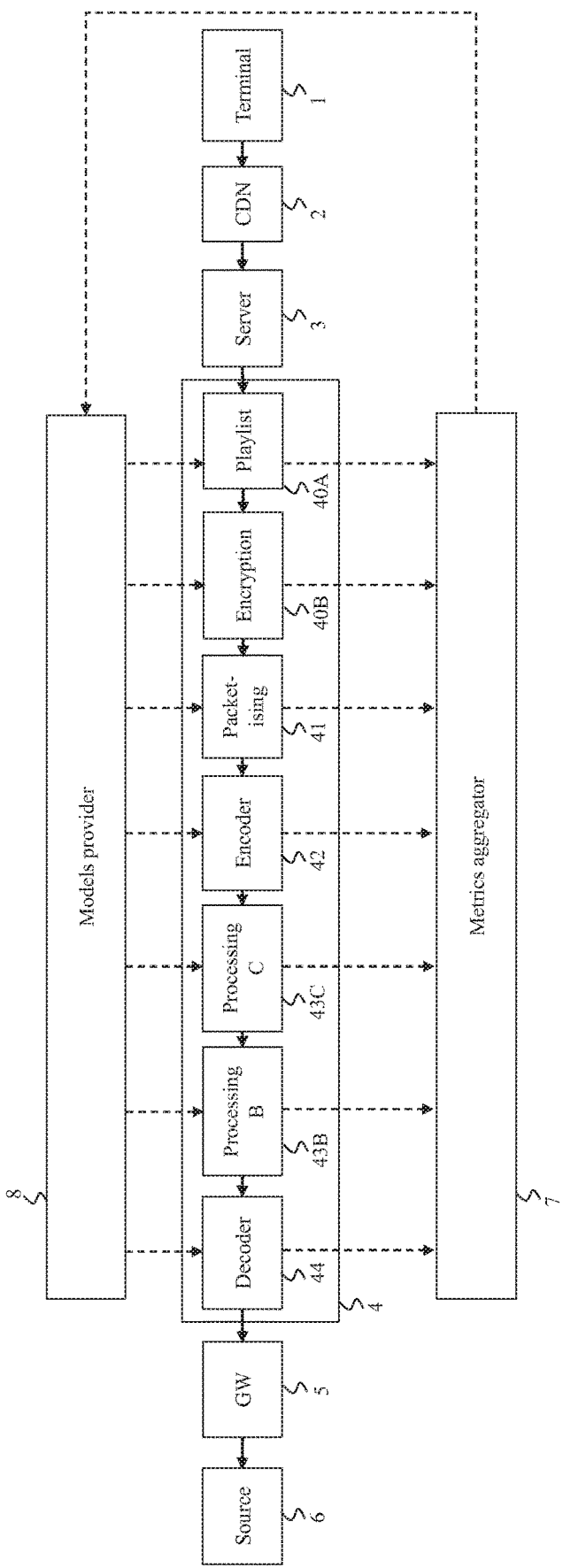
FIG. 2C describes a system for distributing audiovisual contents at a third instant during the distribution.

FIGS. 2A, 2B and 2C describe a development of a system for distributing audiovisual contents during functioning in the case of use of the invention.

At a first instant, corresponding to FIG. 2A, this distribution system comprises a display terminal 1, at least one CDN 2, an original server 3, simply referred to as server hereinafter, a workflow 4, a gateway 5, a source 6, a metrics aggregation module 7 and a modelling module 8. The source 6 comprises at least one audiovisual content, simply referred to as content hereinafter, able to be requested by the terminal 1 according to a particular profile. In a case of live broadcast, the gateway 5 is responsible for transforming a continuous data stream into files. The workflow 4 comprises a set of processing modules comprising a decoding module 44 able to execute audio and video decoding, an image processing module 43A able to apply an image processing A, an encoding module 42 able to perform audio and video encoding and a packetising module 41 able to generate segments in accordance with a predetermined protocol, an encryption module and a rights manager (Digital Rights Management (DRM)) 40B able to apply processing to the segments so as in particular to prevent illicit use of these segments, and a playlist generation module 40A able to generate lists of segments corresponding to the content. The image processing A is for example a noise-reducing filtering. Each processing module of the workflow 4 may be a software module executed by one or more programmable processing units or hardware executed by a dedicated processing unit. The processing modules of the workflow 4 may be colocated geographically and connected for example by a communication bus or dispersed and connected together by a communication network.

Each processing module in the workflow 4 produces, during the functioning thereof, metrics representing said functioning comprising function-specific data as well as system data.

The function-specific data comprise for example: information representing a quality of data generated by a processing module, and/or configuration parameters of a processing module, and/or implementation characteristics of a processing module, and/or characteristics of data to be processed by a processing module, and/or information representing performances of a processing module.

For example:
for a decoding module, a function-specific data item is a number of images decoded per second representing performances of the decoding module;
for an image processing module, a function-specific data item is an image-processing time as a function of a measurement representing a complexity of said image such as for example a variance or an entropy of said image, this processing time being representative of performances of the decoding module;
for an audio and video encoding module, function-specific data may be a signal-to-noise ratio (Peak Signal to Noise Ratio (PSNR)) representing an audio encoding quality, and/or a PSNR representing a video encoding quality and/or a resolution of encoded images representing a configuration parameter of the video encoding module;
for a packetising module, a function-specific data item is a mean number of stuffing bits used at each creation of packets representing a quality of the packetising.

System data comprise for example a number of requests processed by a module and/or a percentage of use of a processing unit such as a CPU and/or a number of accesses to a cache memory, etc.

The metrics aggregation module 7 is responsible for regularly requesting metrics from each of the processing modules in the audiovisual contents distribution system and, for each type of processing implemented by one or more processing modules of said system, aggregating the metrics obtained from each processing module of said system implementing said type of processing. In the context of the invention, these metrics are supplied to the modelling module 8. In one embodiment, the metrics aggregation module 7 is a module of the Prometheus type as described in the internet site https://prometheus.io/docs/introduction/overview/.

The modelling module 8 recovers the metrics specific to each type of processing implemented by one or more processing modules of said system supplied by the metrics aggregation module 7. From these metrics, it defines, for each of said types of processing, at least one behaviour model specific to said type of processing.

Each processing module in the workflow 4 must solve at least two problems: a scaling problem and a load balancing problem. The scaling problem consists of determining a number of processing units to be allocated for executing a set of processing operations requested of the processing module. The load balancing problem consists, once the number of processing units has been determined, of determining how to balance the load of all the processing operations requested of the processing module between the various processing units allocated. Each processing module uses, for each problem to be solved, a behaviour model dedicated to the processing implemented by said processing module and to said problem to be solved. Each processing module therefore uses a behaviour model for solving the scaling problem, referred to as the scaling model, and a behaviour model for solving the load balancing problem, referred to as the load balancing model. The scaling model receives as an input in particular information representing processing operations requested of the processing module and determines, from this information, a number of processing units to be allocated. The load balancing model receives as an input in particular the information representing processing operations requested of the processing module and generates as an output information representing a balancing of the load over the processing units allocated.

In the context of the invention, each behaviour model used is a neural network of the deep learning type. Each behaviour model is therefore defined by learning, i.e. by training. The deep-learning algorithms are particularly adapted to the context of the invention. This is because, unlike the more traditional machine-learning algorithms, deep-learning algorithms make it possible to avoid a step of extracting characteristics before the application of the learning algorithm to these characteristics. However, in the invention, the input data of the learning algorithm, that is to say the data supplied by the metrics aggregation module 7, in addition to being very bulky, are very heterogeneous metrics, that is to say of very different types, structures and natures. For example, a module such as the encoding module 42 generates metrics comprising:
- configuration parameters of the encoding module,
- an encoding standard applied by the encoding module (AVC, HEVC, etc.),
- implementation characteristics of said encoding standard,
- a video quality sought and a video quality obtained,
- a bitrate sought and a bitrate obtained,
- a video encoding resolution,
- a number of processing units used by the encoding module for a given processing operation,
- a type of processing unit used,
- a percentage use of the processing units and of the module,
- information representing the content to be encoded,
- a latency of the encoding module,
- a number of cache hits and a number of cache misses,
- a number of contents to be processed, etc.

It is then very difficult to determine which characteristics are pertinent, or more pertinent than others for solving a given problem. Deep-learning algorithms make it possible to get round this difficulty. This is because deep-learning algorithms are capable of themselves extracting the pertinent characteristics and finding models in a large volume of heterogeneous data.

There exist several types of neural network:
- basic neural networks of the multilayer perceptron type, hereinafter referred to as MLP neural networks;
- recursive neural networks of the recurrent type (Recurrent Neural Network (RNN)), hereinafter referred to as RNN neural networks, and of the long short-term memory type (LSTM), hereinafter referred to as LSTM neural networks;
- convolutional neural networks (CNNs), hereinafter referred to as CNN neutral networks.

Deep-learning algorithms commonly use so-called hybrid networks in that they combine several types of neural network. In the case of the invention, each behaviour model is a hybrid neural network in which a CNN neural network is followed by an LSTM neural network and then by an MLP neural network, the CNN neural network comprising a large number of layers. For example, in one embodiment, the CNN neural network comprises ten layers.

Like all neural networks, each neural network, i.e. each behaviour model based on a neural network, used in the audiovisual content distribution system according to the invention must be trained, i.e. must perform learning. The training consists of determining parameters of the neural network. Determination of these parameters relies on input data of the neural network, referred to as training data, for which the result that the neural network must give is known. Parameters of the neural network making it possible to obtain known results for a large number of training data are then sought. In the context of the invention, for a given processing module, the input data are metrics supplied by said processing module. When the audiovisual content distribution system is started up, no processing having been performed, no metric is available for carrying out training (i.e. learning). In one embodiment, prior to the launch of the audiovisual content distribution system according to the invention, each neural network was trained from metrics supplied by an operator for which the processing results are known. For each processing module, the metrics supplied are metrics identical to the metrics supplied by said processing module. These metrics were for example obtained from processing modules of conventional audiovisual content distribution systems, such as systems of the HAS or JIT type, equivalent to said processing module. For the scaling model, the known results corresponding to these metrics comprise numbers of processing units allocated. For the load balancing model, the known results corresponding to these metrics comprise information representing a balancing of processing operations requested on allocated processing units. In one embodiment, the metrics comprise metrics for which no overload of the allocated processing units or no unacceptable processing latency have been found and metrics for which unacceptable overloads and latencies have been found. The neural networks are then defined so as to exclude the cases of overload.

The neural networks thus trained are used at the start-up of the audiovisual content distribution system. Subsequently, the training of the neural networks continues during the functioning of the audiovisual content distribution system according to the invention using the metrics supplied by the processing modules of said system. Thus the impact of the metrics supplied by the operator in the definition of the neural networks is little by little attenuated. For example, in the case of the video encoding module 42, the training of the scaling model uses a set of characteristics taking the form of a parameter vector, some parameters being themselves vectors. This parameter vector comprises the following parameters:

- Video_Codec_id: identifier of the video encoder used (AVC, HEVC, etc.);
- Codec_implementation_id: identifier of an implementation of the encoder used;
- video_Profile: video profile used by the encoder;
- Level: level used by the encoder;
- Output_Bitrate: output bitrate of the encoder;
- Output_Width: width of the images output from the encoder;
- Output_Height: height of the images output from the encoder;
- Output_FrameRate: number of images per second output from the encoder;
- Quality_level: quality level output from the encoder;
- Segment_duration: duration of a segment;
- GopSize: size of a GOP (group of pictures);
- Segment_complexity: information representing a complexity of the scene represented by the segment;
- Unit_type_id: type of processing unit used;
- vCpu_type_id: identifier associated with each type of virtual CPU;
- vCpu_frequency: frequency of functioning of the CPU;
- vCpu_cores: number of cores in the CPU;
- Unit_vCpu_count: number of virtual CPUs per processing unit;
- Memory_Size: RAM (random access memory) size;
- VRTR (RealTimeRatio_1, RealTimeRatio_2, . . . , RealTimeRatio_m): vector of the last m ratios between the time for executing a task and the real time. In practice, the execution time is calculated between the instant of reception of a request and the response to this request. The real time represents the duration of a segment (i.e. Segment_duration);

NAA: represents a number of available processing units already allocated.

In the case of the packetising module 41, the training of the scaling model uses a second set of characteristics taking the form of a parameter vector, some parameters being themselves vectors. This parameter vector comprises the following parameters:

Packaging_type_id: identifier of a transport format (i.e. MPEG-2 TS (ISO/IEC 13818-1), MP4 (ISO/IEC 14496-14), fMP4 (fragmented MP4);
Segment_duration;
Fragment_duration: duration of a sub-part of a segment;
chunk_duration: duration of a sub-part of a fragment;
video_profile;
Audio_profile: audio profile;
Video_codec_id;
Video_bitrate: video bitrate;
Audio_codec_id: identifier of the audio encoder;
Audio_bitrate: audio bitrate;
Encryption_type_id: type of encryption used by the encryption module 40B;
VRTR (RealTimeRatio 1, RealTimeRatio 2, . . . , RealTimeRatio_m);
NAA.

For the record, the concepts of segment, fragment and chunk are dependent on the transport format used. The MPEG-2 TS format offers great granularity in terms of random access to portions of streams that can be decoded independently. Thus the MPEG-2 TS format makes it possible to have segments wherein the first bytes can be processed by a decoder as soon as received. Originally, the mp4 format did not offer as fine a granularity as the MPEG-2 TS format. This is because the mp4 segment has a syntactical structure preventing a decoder from beginning to process quickly the first bytes received. To overcome this defect, the MP4 segments have been divided into fragments, a fragment being a stream portion beginning with a synchronisation point as from which a decoder can begin a syntactical analysis (parsing) of said stream. Subsequently, the granularity of the fragments being judged insufficient, these were divided into chunks, a chunk also being a stream portion beginning with a synchronisation point as from which a decoder can begin a syntactical analysis of said stream. In the case of the module generating reading lists 40A, the training of the scaling module uses a third set of characteristics taking the form of a parameter vector, some parameters themselves being vectors. This parameter vector comprises the following parameters:

HAS_protocol_id: identifier of an HAS protocol (i.e. HLS, DASH, etc.);
Packaging_type_id;
Video_profile;
Audio_profile;
Subtitles_profile: profile used for the subtitles;
Encryption_type_id;
Video_Rolling_Key: information representing a rolling video encryption key used by the encryption module 40B;
Audio_Rolling_Key: information representing a rolling audio encryption key used by the encryption module 40B;

Segment_duration:
Ultra Low_latency: information indicating whether very high granularity of the stream is used;
Refresh_frequency: information representing a refresh frequency of a reading list;
VRTR (RealTimeRatio 1, RealTimeRatio 2, . . . , RealTimeRatio_m);
NAA.

In the case of a video encoding module 42, the training of the load balancing model uses a fourth set of characteristics taking the form of a parameter vector, some parameters themselves being vectors. This parameter vector comprises the following parameters:

Codec_id;
Codec_implementation_id;
Video_Profile;
Level;
Output_Bitrate;
Output_Width;
Output_Height;
Output_FrameRate;
Quality_level;
Segment_duration;
GopSize;
Segment_complexity;
n: number of processing units used.

For each of the n processing units, the parameter vector comprises the following parameters: Unit_type_id_i (where i is the index of one of the n processing units), vCpu_type_id_i, vCpu_frequency_i, vCpu_cores_i, vCpu_count_i, Memory_Usage_i, Success_Balancing_i. The parameters success_Balancing_i represent a ratio between a number of tasks performed by the processing unit i and the sum of the RealTimeRatios for each of these tasks.

The parameters Memory_Usage_i represent a proportion of use of the memory.

In the case of the packetising module 41, the training of the load balancing model uses a fifth set of characteristics taking the form of a parameter vector, comprising the following parameters:

Packaging_type_id;
Segment_duration;
Fragment_duration;
Chunk_duration;
Video_profiles;
Audio_profiles;
Video_codec_id;
Video_bitrate;
Audio_codec_id;
Audio_bitrate;
Encryption_type_id;
n;

For each of the n processing units, the parameter vector comprises the following parameters: Unit_type_id_i, vCpu_type_id_i, vCpu_frequency_i, vCpu_cores_i, vCpu_count_i, Memory_Usage_i, Success_Balancing_i.

In the case of the reading list generating module 40A, the training of the load balancing model uses a sixth set of characteristics taking the form of a parameter vector comprising the following parameters:

HAS_protocol_id;
Packaging_type_id;
Video_profiles;
Audio_profiles;
Subtitles_profiles;
Encryption_type_id;
Video_Rolling_Key;

Audio_Rolling_Key;
Segment_duration;
Low_latency;
Refresh_frequency;
n;

For each of the n processing units, the parameters comprise: Unit_type_id_i, vCpu_type_id_i, vCpu_frequency_i, vCpu_cores_i, vCpu_count_i, Memory_Usage_i, Success_Balancing_i.

In one embodiment, the training (i.e. the learning) of the neural networks (i.e. of the scaling and load balancing models) performed by the modelling module 8 is done asynchronously, that is to say:

- the recovery of the metrics necessary for the learning can be done off-line or in a way that is completely desynchronised from the functioning of the workflow 4 (or of each workflow implemented by the audiovisual content distribution system);
- the training and the updating of the neural networks by the modelling module 8 is a parallel process completely decorrelated from the processes executed in the workflow 4 (or in each workflow implemented by the audiovisual content distribution system);
- each module in the workflow 4 may at any time request of the modelling module 8 an updating of the scaling and load balancing models, without these updating requests being related to the processes executed by said module or by any other module in the workflow 4 (or of each workflow implemented by the audiovisual content distribution system).

In the example in FIG. 2A, the distribution system is in the process of distributing a content. The terminal 1 has fixed a profile and the distribution system supplies segments compatible with this profile. As seen above, for each segment of the content, the terminal 1 sends a request in order to obtain said segment containing information representing the required profile. Each segment was chosen in a playlist supplied by the playlist generation module from among a set of segments corresponding to different versions of the same sub-part of the content.

As we describe hereinafter, the workflow 4 is defined dynamically for each segment by the terminal 1 or by an intermediate device, which may be the CDN 2 or the server 3. For each segment, each processing module was chosen from a set of candidate processing modules able to apply exactly the same processing. Thus, although from one segment to another the workflow 4 may apply strictly identical processing operations, each processing operation may be executed by different processing modules. For a processing of a given type, a change in processing module may be motivated by a temporary non-availability of a processing module, for example when this processing module is already being used for generating another segment, by a malfunctioning of said processing module, by an overload of the computing unit that is to implement said processing module, by a choice of an operator wishing to privilege certain processing units rather than others, etc.

At a second instant depicted in FIG. 2B, still in the course of the distribution of the content, an operator has for example realised that a quality of the content displayed on the terminal 1 was not sufficient. In this context, an image processing B would be more appropriate than the imaging processing A. The image processing B is for example a filtering for enhancing contours. In this case, the operator sends for example a command to the terminal 1 so that the terminal 1 generates a request for modifying the workflow 4. Following this command, the image processing module 43A is replaced by an image processing module 43B performing the image processing B. Following the replacement of the image processing module 43A with the image processing module 43B, the metrics aggregation module 7 requests metrics of the image-processing module 43B. The modelling module 8 recovers the metrics specific to the image-processing module 43B supplied by the metrics aggregation module 7. Two embodiments can then be envisaged. In one embodiment, the modelling module 8 learns a scaling model and a load balancing model specific to the image-processing module 43B independent of the behaviour models of the image-processing module 43A. In another embodiment, the modelling module considers that the behaviour models learnt for the modelling module 43A constitute a good starting basis for learning the behaviour models of the image processing module 43B. Thus the parameters of the neural network learnt for the behaviour models of the image processing module 43A serve to initialise the parameters of the neural network of the behaviour models of the image processing 43B.

At a third instant depicted in FIG. 2C, still during the content distribution, the operator has for example realised that the content is being broadcast fraudulently on unauthorised terminals. In this context, in order to stop this fraud, a processing C of the digital watermarking type is appropriate. In this case, the operator sends for example a command to the terminal 1 so that the terminal 1 generates a request for modifying the workflow 4. Following this parameterising by the operator, a digital watermarking module 43C is added to the workflow 4 between the processing module 43B and the encoding module 42. Following the addition of the image processing module 43C, the metrics aggregation module 7 requests metrics of the digital watermarking module 43B. The modelling module 8 recovers the metrics specific to the digital watermarking module 43C supplied by the metrics aggregation module 7. The modelling module 8 then learns a scaling model and a load balancing model specific to the digital watermarking module 43C. The examples described in FIGS. 2A, 2B and 2C show that the invention affords great dynamicity and agility in the definition of the workflow 4. Thus a different workflow can be defined at each segment. It should be noted that the definition of the workflow is dynamic not only in the choice of the candidate processing module having to implement such and such a processing, but also in terms of choice of processing operations to be applied by this workflow.

In one embodiment, each processing module in the workflow 4 is implemented by an elementary module that we describe hereinafter in relation to FIGS. 3 and 4. Each elementary module makes available to the workflow 4 one or more processing units for implementing a processing module of the workflow 4. A role of an elementary module responsible for a processing operation in a workflow is to choose which processing unit or units among a set of processing units of which it has knowledge must execute said processing operation. For a given workflow, no processing operation implemented by an elementary module is executed by a processing unit defined in advance in a centralised manner. As we show in the following FIGS. 5 and 6, each request of the terminal 1 for a segment gives rise, for each elementary module involved in a processing operation in the workflow that is to produce this segment, to a scaling decision and a load balancing decision. In this way, each processing module determines how many processing units are to be allocated when implementing all the processing operations that are requested of it (comprising the processing operation requested in the request that give rise to the decision taking) and how to balance the load of these processing operations over the processing units. From one segment to another, the processing unit or units selected may be different. To take these decisions, each elementary module relies on the scaling and load balancing models corresponding to the type of processing implemented by said elementary module supplied by the modelling module 8.

Moreover, an elementary module may contribute to a plurality of workflows in parallel, each workflow making it possible to distribute an audiovisual content stored or produced live by a source to a display terminal. An elementary module is therefore not monopolised by a workflow. At each processing operation performed by an elementary module, said elementary module generates metrics corresponding to the type of processing that said module implements and which are harvested regularly by the metrics aggregation module 7.

It will be noted that, in FIGS. 2A, 2B and 2C, we have shown a workflow 4. The metrics aggregation 7 and modelling 8 modules are however connected to a plurality of workflows. Thus the metrics aggregation module 7 obtains metrics of a plurality of workflows sharing or not elementary modules. The modelling module 8 generates scaling and load balancing models that are used in parallel in a plurality of workflows.

Figure 5:
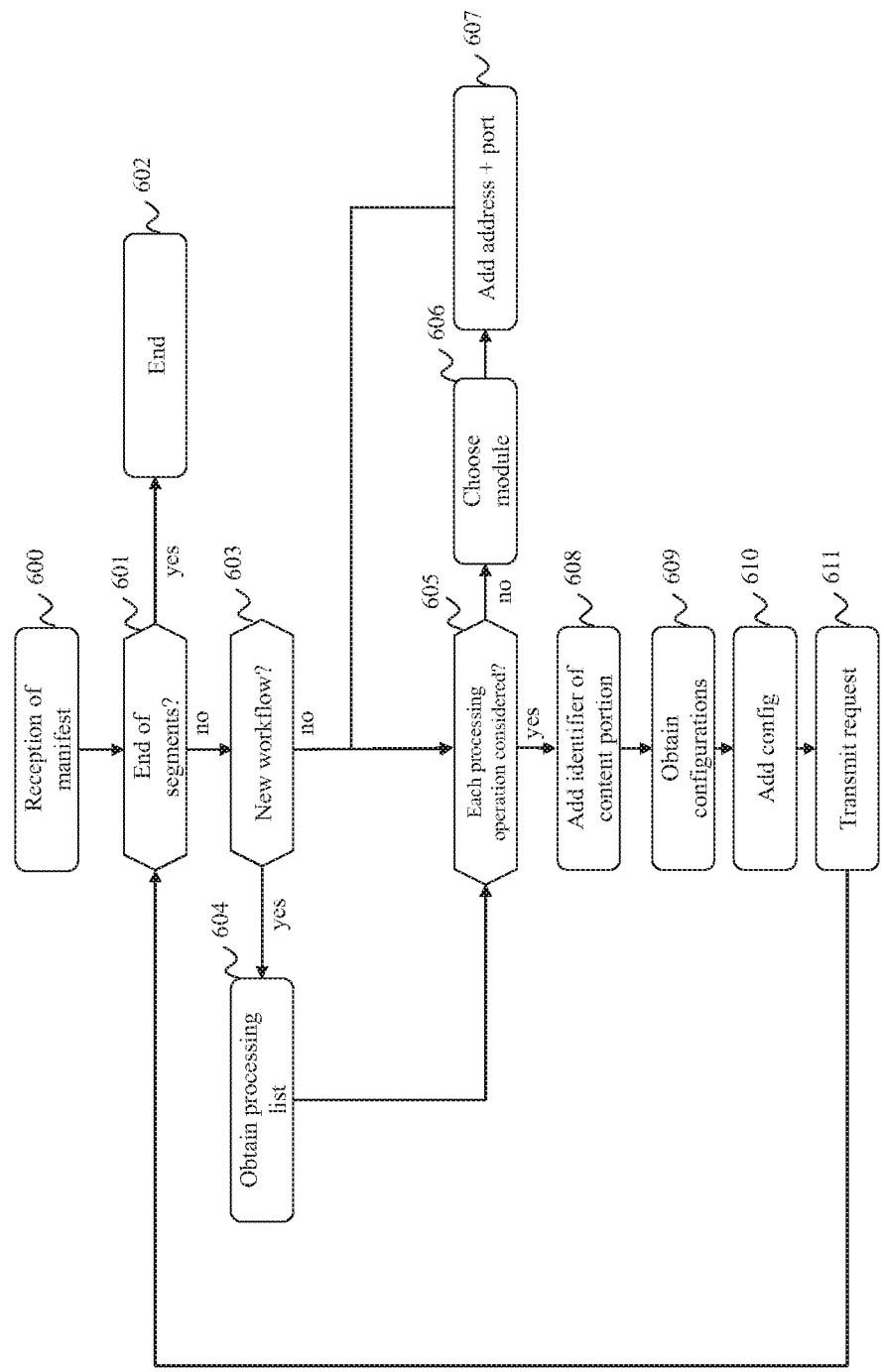
FIG. 5 illustrates schematically a procedure for launching a workflow.

FIG. 5 illustrates schematically steps of a method for activating a workflow so that a terminal can obtain a segment.

According to one embodiment, the method in FIG. 5 is executed by the terminal 1. The method in FIG. 5 enables the terminal 1 to activate a workflow in order to obtain a segment. In one embodiment, the segment requested is in accordance with the HLS protocol and each data transmission, each request and each demand is made in the form of transmissions of requests in accordance with the HTTP/HTTPS (HTTP secured) protocol.

Prior to the execution of the method in FIG. 5, we suppose that the terminal 1 has requested of the CDN 2 a manifest concerning a content. In a step 600, the terminal 1 receives a request containing the manifest coming from the CDN 2. This manifest describes each profile that may be requested by the terminal 1.

In a step 601, the terminal 1 determines whether it must continue to play the current content or not, i.e. whether it must request a new segment, referred to as the current segment. This information has for example been supplied by a user of the terminal 1. If the terminal 1 must not continue to play the content, the method ends in a step 602.

Otherwise, the step 601 is followed by a step 603. During the step 603, the terminal 1 determines whether the workflow 4 used for the segment preceding the current segment must be modified. In other words, is it necessary to add, omit or replace a processing operation executed by the workflow 4 in order to obtain the current segment. In one embodiment, at the time of each change of profile, the terminal 1 considers that the workflow 4 must be modified. During the step 603, the terminal 1 selects a profile, referred to as the current profile, among the profiles of the manifest according to transmission and processing constraints obtained by the terminal 1. The transmission constraints are for example a constraint on bitrate measured by the terminal 1. The processing constraints are for example a display capability (i.e. a screen resolution) of the terminal 1, a number of images able to decoded per second, etc. Once determined, the current profile is compared with the profile requested for the segment preceding the current segment. If the two profiles are identical, the terminal 1 performs a step 605. If the two profiles are different or if the current segment is the first segment requested for the content, the terminal 1 performs a step 604.

In the step 604, the terminal 1 obtains a list of processing operations representing the workflow 4 to be applied to a portion of the content in order to obtain the current segment. In this embodiment, this list is deduced from the profile selected in the step 603. The terminal 1 has for example a lookup table associating each profile that can be requested for a content, with a list of processing operations.

The step 604 is followed by the step 605. During the step 605, the terminal 1 uses either the list of processing operations defined during the step 604, or the list of processing operations corresponding to the workflow applied to the segment preceding the current segment. In one embodiment, the list of processing operations used in the step 605 is an ordered list in which the processing operations to be applied to the portion of the content in order to obtain the current segment appear in the reverse order in which these processing operations must be applied. For example, if the example in FIG. 2A is taken, the list of processing operations is as follows:

1. packetising in accordance with the HLS protocol;
2. encoding in accordance with the AVC standard;
3. processing A;
4. decoding in accordance with the HEVC standard.

In the step 605, the terminal 1 determines whether each processing operation in the list of processing operations has been considered. If not, the terminal 1 runs through the list from the first processing operation seeking the next processing operation not yet considered.

In a step 606, the terminal 1 chooses an elementary module in a set of modules able to perform said processing operation.

In a step 607, the terminal 1 adds an identifier composed of an address and a port number of the elementary module chosen in a request. Each identifier is written following any identifier or identifiers already present in the request.

The step 607 is followed by the step 605, during which the terminal 1 passes to the following processing operation in the list.

When all the processing operations in the list have been considered, the terminal 1 passes to a step 608. In the step 608, the terminal 1 adds to the request information representing the required portion of the content. This information also makes it possible to identify the source storing or producing said content live. In the examples in FIGS. 2A, 2B and 2C, it is considered that the source of the content is the gateway 5.

In a step 609, the terminal 1 obtains, for each processing operation, information representing configuration parameters of the elementary module corresponding to said processing operation, the information representing the configuration parameters having been obtained from in particular the profile selected in the step 603.

In a step 610, the terminal 1 adds the information representing configuration parameters of each module in the request.

Supposing that the workflow to be applied to the current segment is the workflow 4 in FIG. 2A, the request comprises the following sequence:

http://Address1:port1/Address2:port2/Address3:port3/Address4:port4/IDportion?Conf where Address1:port1 (and respectively Address2:port2, Address3:port3, Address4:port4) corresponds to the identifier (the address and the port number) of the module 41 (and respectively the identifier of the module 42, of the module 43 and of the module 44). IDportion corresponds to the information representing the portion of the content. Conf corresponds to the information representing configuration parameters of each module.

In one embodiment, the information conf takes the following form:

Conf1=NameConf1&Conf2=NameConf2&Conf3=NameConf3&Conf4=NameConf4 where ConfN corresponds to an identifier of information representing configuration parameters of an elementary module N and NameConfN corresponds to a name of the text file, for example to the JSON (JavaScript Object Notation) or XML (Extensible Markup Language) format containing the detailed configuration parameters that it will be necessary to apply. In one embodiment, these text files are known to each elementary module.

In another embodiment, the field conf explicitly comprises each configuration parameter to be applied to an elementary module.

In a step 611, the terminal 1 transmits the request to the first destination elementary module in order to launch the execution of the workflow and thus to cause the transmission of the current segment to the terminal 1.

It should be noted that the broadcasting systems described in relation to FIGS. 2A, 2B and 2C comprise a CDN 2 and a server 3 situated between the terminal 1 and the workflow 4. In this case, the request sent by the terminal 1 passes through the server 2 and the CDN 3 without intervention by these, which merely retransmit it.

It should be noted that the method described in relation to FIG. 5 forms a procedure for launching the workflow 4 enabling the terminal 1 to obtain one segment. In general, a terminal does not request only one segment, but a set of successive segments forming an audiovisual content. In this case, the method in FIG. 5 is executed for each segment of said audiovisual content.

Figure 3:
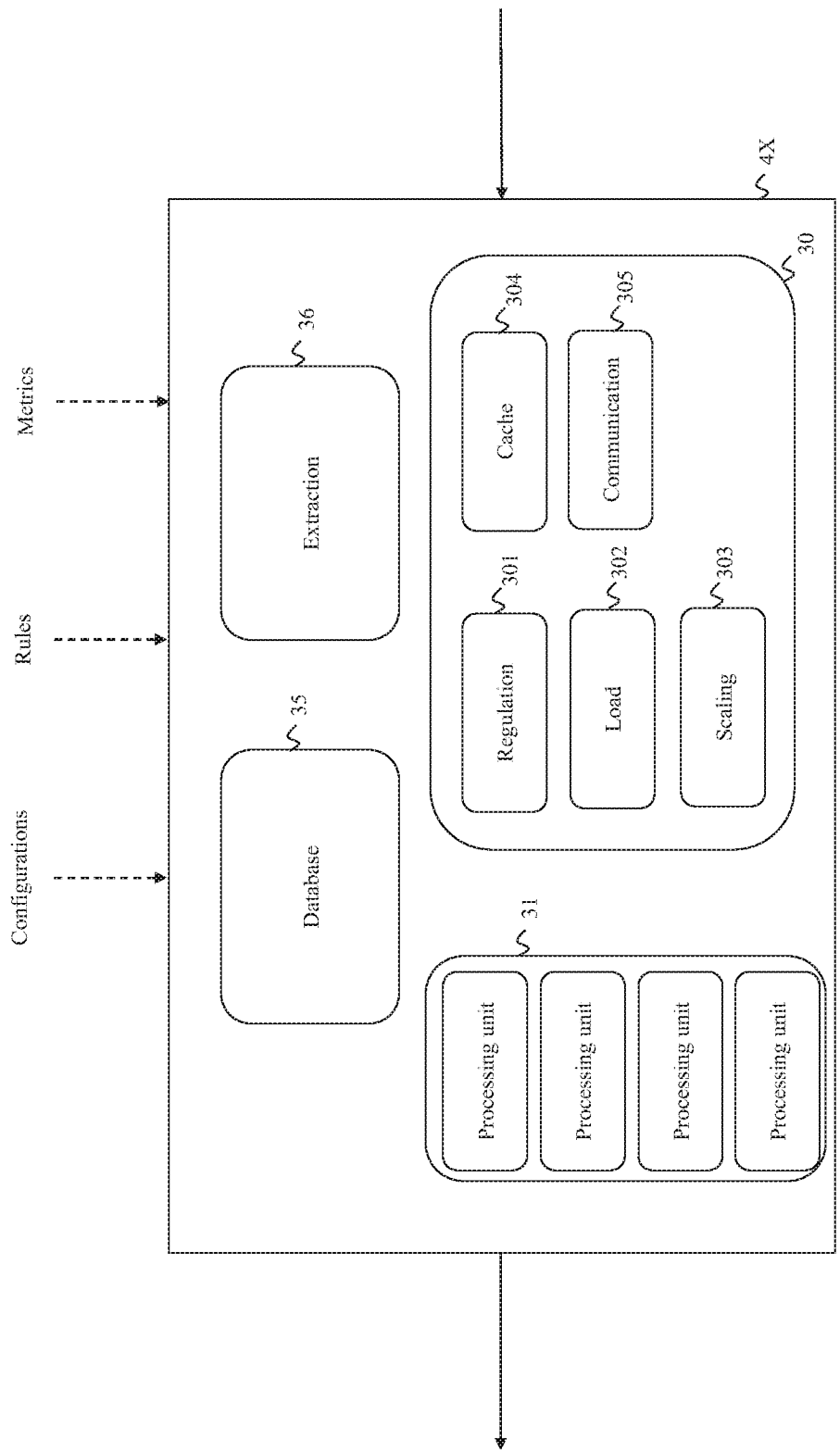
FIG. 3 illustrates schematically an elementary module able to execute a processing of a predefined type of a workflow.

FIG. 3 illustrates schematically an elementary module 4X able to execute a processing operation of a predefined type of a workflow.

The elementary module 4X in FIG. 3 is for example an elementary module implementing one of the processing modules 41, 42, 43A, 43B, 43C or 44. If for example the elementary module implements the processing module 41, the type of processing implemented by the elementary module 4X is therefore a packetising in accordance with the HLS protocol.

The elementary module 4X comprises a variable plurality of processing units 31 available for executing the processing of the predefined type, the elementary module 4X regularly obtaining information representing each processing unit added or removed from the plurality. Each processing unit in the plurality is said to be stateless, that is to say it does not keep any information concerning a processing operation once the processing has been carried out. One advantage of a stateless processing unit is that it can easily pass from one processing operation to another without the successive processing operations concerning the same content, the same workflow or the same terminal.

The elementary module 4X also comprises a central module comprising a communication module 305, a scaling module 303 and a load balancing module 302 and a database 35.

The communication module 305 is able to receive requests for first data. A request for first data is for example the request transmitted by the terminal 1 during the step 611 when the elementary module 4X implements the processing module 41. When the elementary module implements the processing module 42 (or respectively 43 or 44), a request for first data corresponds to the request transmitted by the terminal 1 during the step 611 modified by the elementary module implementing the processing module 41 (or respectively by the elementary modules implementing the processing modules 41 and 42 or by the elementary modules implementing the processing modules 41, 42 and 43) in accordance with a modification procedure described in relation to FIG. 6. In the case where the elementary module 4X implements the processing module 41, the first data correspond to the current segment since the module 44 is the last module in the workflow. The request generated by the terminal 1 therefore requests of the elementary module 4X the current segment. When the elementary module 4X implements the processing module 42 (or respectively 43 or 44), the first data are a result of the processing operations on the content portion corresponding to the identifier IDportion by the processing modules 43 and 44 (or respectively of the processing of said content portion by the processing module 44 or said content portion).

As seen above, this request for first data comprises information representing a workflow to be applied to the content portion corresponding to the identifier IDportion in order to obtain the first data and information representing configuration parameters to be applied to at least one processing unit of said elementary module in order to generate the first data. In the case where the elementary module 4X implements the processing module 41, the information representing the workflow (i.e. the sequence Address1:port1/Address2:port2/Address3:port3/Address4:port4) describes the entire workflow. When the elementary module implements the processing module 42 (or respectively 43 or 44), the information representing the workflow describes the workflow up to the processing module 42 (i.e. Address2:port2/Address3:port3/Address4:port4) (or respectively as far as the module 43 (Address3:port3/Address4:port4) or 44 (Address4:port4)).

The communication module 305 is also able to transmit a request for second data to the source 5 or to a unit preceding the elementary module 4X in the workflow 4 determined from the information representing the workflow. When the elementary module 4X implements the processing module 41, the unit preceding the elementary module 4X is an elementary module implementing the processing module 42. The second data correspond to a result of an application of the processing modules 42, 43 and 44 to the content portion corresponding to the identifier IDportion. When the elementary module 4X implements the processing module 42, the unit preceding the elementary module 4X is an elementary module implementing the processing module 43. The second data correspond to the result of an application of the processing modules 43 and 44 to the content portion corresponding to the identifier IDportion. When the elementary module 4X implements the processing module 43, the unit preceding the elementary module 4X is an elementary module implementing the processing module 44. The second data correspond to the result of an application of the processing module 44 to the content portion corresponding to the identifier IDportion. When the elementary module 4X implements the processing module 44, the unit preceding the elementary module 4X is the source 5. The second data correspond to the content portion corresponding to the identifier IDportion.

The communication module 305 is furthermore able to transmit the first data requested of the unit that sent the request for said first data. When the elementary module 4X implements the processing module 41, the unit that sent the request is the terminal 1. When the elementary module 4X implements the processing module 42, the unit that sent the request is the elementary module implementing the processing module 41. When the elementary module 4X implements the processing module 43, the unit that sent the request is the elementary module implementing the processing module 42. When the elementary module 4X implements the processing module 44, the unit that sent the application is the elementary module implementing the processing module 43.

In one embodiment, the communication module 305 is a web server.

The scaling module 303 determines a number of processing units to be allocated for implementing all the processing operations requested of the elementary module 4X. The determination of the number of processing units to be allocated relies on the scaling model corresponding to the processing of the predefined type provided by the modelling module 8. According to the number of processing units to be allocated determined, the scaling module 303 allocates available processing units or deallocates processing units, taking into account the processing units already allocated.

The load balancing module 302 is able to choose, for each request received, at least one processing unit among the processing units allocated by the scaling module 303 and able to launch the processing of the predefined type by each processing unit chosen in order to obtain the first data requested from the second data. The choice of the processing units to be used relies on the load balancing model supplied by the modelling module 8. In one embodiment, the database 35 is intended to store text files, for example to the JSON or XM format containing each of the detailed configuration parameters corresponding to the information representing the configuration parameters NameConfN contained in the requests for first data. In one embodiment, the database 35 also stores text files that do not directly correspond to the profiles requested by terminals, but to so-called constraint profiles containing constraint configuration parameters fixed by an external entity independently of a request for first data. These constraint configuration parameters are for example parameters imposed by an operator that do not appear in a profile. For example, these parameters may force a video encoder to function with a restricted number of compression tools.

In one embodiment, the central module 30 comprises a cache memory 304 used for temporarily storing, according to a predefined cache memory management method implemented by a cache management module, first data generated by the elementary module 4X. The cache memory management method may consist simply of storing in the cache memory 304 each first data item for a predefined period and deleting these first data after this predefined period. In one embodiment, the cache management module may calculate statistics on the contents requested and adjust the duration of storage of the first data according to these statistics. For example, the method for managing the cache memory 304 may consist of increasing the predefined duration of storage for the first data corresponding to contents that are very much requested and reducing the duration of storage for the first data corresponding to the contents that are little requested. In one embodiment, the communication module 305 implements the method for managing the cache memory 304. In this case, the elementary module 4X does not comprise a cache management module.

In one embodiment, the elementary module 4X comprises an extraction module 36 able to extract the information representing the configuration parameters of each request for first data received by the elementary module 4X.

In one embodiment, the central module 30 comprises a regulation module 301 supplying management rules. These management rules are for example cache management rules taken into account in the procedure for managing the cache memory 304, rules for allocating processing units intended for the scaling module 304 and load balancing rules intended for the load balancing module 302. The regulation module 301 stores predefined management rules and/or receives management rules from an external entity. The cache management rules fix for example the duration of storage of the first data in the cache memory 304. The allocation rules fix for example which processing units must be allocated or deallocated as a priority according to criteria of computation capacity, energy consumption or financial cost of use of each processing unit. The load management rules may for example fix when a processing unit is considered to be overloaded and must no longer be solicited for new processing operations. In one embodiment, the modules 30, 301, 302, 303, 305 and 36, the database 35 and the cache memory 304 are included in a single item of equipment 4Y and connected together by a communication bus. The processing units in the plurality 31 are included in the equipment 4Y or included in other items of equipment connected to the equipment 4Y by a communication network.

Figure 4:
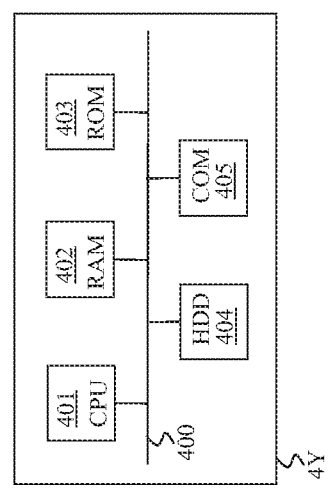
FIG. 4 illustrates an example of hardware architecture of the elementary module used in the context of the invention.

FIG. 4 illustrates an example of hardware architecture of an item of equipment 4Y used in the context of the invention. In the example in FIG. 4, the equipment 4Y implements the modules 30, 301, 302, 303, 305 and 36, the database 35 and the cache memory 304, and comprises certain processing units in the plurality 31.

The equipment 4Y then comprises, connected by a communication bus 400: a plurality of processing units 401; a random access memory RAM 402, a read only memory ROM 403; a storage unit or a storage medium reader, such as an SD card reader 404; a set of communication interfaces 405 enabling the equipment 4Y to communicate with other units in the workflow, i.e. with other elementary modules, with the source 5, the terminal 1 and with other items of equipment. In one embodiment, the storage unit 404 stores the database 35 and the cache memory 304.

Figure 6:
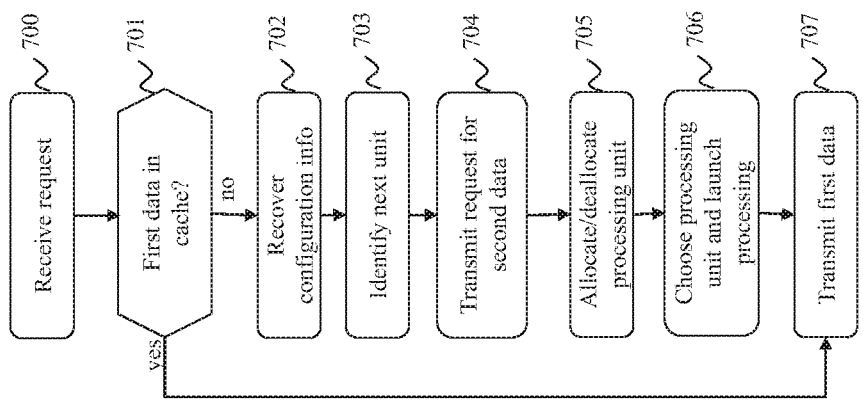
FIG. 6 illustrates schematically a method executed by an elementary module during reception of one or more requests for first data.

Each processing unit in the plurality 401 is capable of executing instructions loaded in the RAM 402 from the ROM 403, from an external memory (not shown), from a storage medium, such as an SD card, or from a communication network. When the equipment 4Y is powered up, each processing unit in the plurality 401 is capable of reading instructions from the RAM 402 and executing them. Each module of the elementary module 4X, the processing of the predefined type performed by the elementary module 4X and the method described hereinafter in relation to FIG. 6 are depicted in the form of instructions forming a computer program. When one or more processing units load a computer program corresponding to a module (or respectively to a processing operation or to the method described in relation to FIG. 6) it implements said module (or respectively said processing operation or said method). In one embodiment, each processing unit in the plurality is a physical processor (or logic processor implemented by a physical processor), a microcontroller or a DSP (digital signal processor) loading one of the computer programs.

However, in one embodiment, all or some of the modules, the processing of the predefined type or the method described in relation to FIG. 6 may be implemented in hardware form by a machine or a dedicated component, such as an FPGA (field-programmable gate array) or an ASIC (application-specific integrated circuit).

In one embodiment, the modules of the elementary module 4X, the database 35 and the cache memory 304 are dispersed completely or partially over different items of equipment, and connected together by a communication bus when they are on the same item of equipment or by a communication network when they are on different items of equipment.

Hereinafter, in relation to FIG. 6, we describe how an elementary module manages a reception of a request for first data.

FIG. 6 illustrates schematically a method executed by an elementary module when one or more requests for first data are received.

In a step 700, the communication module 305 of the elementary module 4X receives a request for first data. As seen above, when the elementary module 4X implements the processing module 41, the request for first data corresponds to the request transmitted by the terminal 1 during the step 611. However, the communication module 305 of the elementary module 4X may receive a plurality of requests for first data almost simultaneously. For example, when the elementary module 4X implements the processing module 41, the communication module 305 may receive a plurality of requests for first data from a plurality of terminals. Moreover, the elementary module 4X may also be currently processing one or more requests for first data.

In a step 701, the communication module 305 of the elementary module 4X verifies, for each application for first data received, a presence of said first data in the cache memory 304. When, for a request for first data, the first data are absent from the cache memory, in one embodiment the extraction module 36 extracts during a step 702 the information representing configuration parameters of said request for first data. Since the elementary module 4X does not have the first data available to it, it must request them. To do this, the communication module 305 transmits, in a step 704, a request for second data to the gateway 5 or to a unit preceding the elementary module 4X in the workflow 4. The module, in a step 703, determines to what it must transmit the request for second data from the information representing the workflow. In the embodiment described in relation to FIGS. 2A, 3, 4, the unit preceding the elementary module 4X in the workflow 4 is either the gateway 5 or an elementary module. If the elementary module 4X implements the processing module 41, the elementary module preceding the elementary module 4X in the workflow 4 is an elementary module implementing the processing module 42. As seen above, the request for second data corresponds to a modified version of the request for first data. At the time of the modification, the communication module deletes the identifier of the elementary module 4X from the request for first data. Thus, if the elementary module 4X implements the processing module 41, the request for first data comprises the following sequence:

http://Address1:port1/Address2:port2/Address3:port3/Address4:port4/IDportion?Conf and becomes:

http://Address2:port2/Address3:port3/Address4:port4/IDportion?Conf once modified in order to obtain the request for second data.

In a step 705, the scaling module 303 determines a number NU of processing units to be allocated for executing each processing operation requested in each request for first data received for which the first data are absent from the cache memory 304. To do this, the scaling module 303 injects metrics into the scaling module corresponding to the processing of the predefined type. These metrics comprise in particular the configuration parameters of these requests for first data corresponding to the processing of the predefined type, characteristics of the predefined processing as implemented by the elementary module 4X and characteristics of the second data to be processed. For example, for the encoding module 42, the configuration parameters of a request for first data, that is to say corresponding to encoded data, comprise the following parameters also used for training the scaling module corresponding to the encoding module 42: Codec_id, Codec_implementation_id, Video_profile, Video_level, Output_bitrate, Output_width, Output_Height, Output_FrameRate, Quality_Level, Segment_duration and GopSize. Characteristics of the encoding as implemented by the encoding module 42 comprise for example information indicating whether the implementation of the encoding comprises parallelisable processes and, if so, how many processes can be parallelised. Characteristics of the second data to be processed, that is to say data to be encoded for the encoding module 42, comprise for example the parameter Segment_complexity also used during the training. Following the determination of the number of processing units to be allocated NU, the scaling module 303 compares the number NU with a number of available processing units already allocated NAA. If NU>NAA, the scaling module 303 allocates a number of processing units equal to NU-NAA. The processing units previously allocated remain allocated. If NU<NAA, the scaling module 303 deallocates a number of processing units equal to NAA-NU among the processing units previously allocated. If NU=NAA, the number of processing units allocated remains unchanged. It should be noted that the scaling model used by the element module 4X is defined so that the elementary module 4X always has a sufficient number of processing units available. The objective is that the elementary module 4X is never in an overload situation, which would involve unacceptable delays in processing the requests for first data. The number of processing units to be allocated NU therefore does not solely correspond to a number NR of processing units necessary for implementing all the processing operations requested of the elementary module 4X, but corresponds to the sum of the number NR and a safety margin MS making it possible to support rapid increases in the number of requests for first data. The deep-learning algorithm is defined so as to find a better compromise between a need to define a safety margin MS sufficient to avoid overloads and a need not to allocate a disproportionate number of processing units, which can increase an operating cost of the audiovisual content distribution system. For example, for the scaling model corresponding to the encoding module 42, the following parameters, used during the training of said model, make it possible to adjust the parameters of said model in order to achieve the objective of avoiding overload of the processing unit allocated: Unit_type_id, vCpu_type_id, vCpu_Frequency, VCpu_Cores, Unit_vCpu_count, Memory_size and VRTR. This is because each parameter RealTimeRatio is a good indicator for determining whether a CPU the characteristics of which are known is overloaded or not when it must execute a processing operation the characteristics of which are known. The parameters of the scaling model (i.e. of the neural network corresponding to the scaling model) will be adjusted by training so as to avoid overloads of the CPU.

In a step 706, the load balancing module 302 chooses, for each request for first data, at least one processing unit among the processing units allocated for executing the processing of the predefined type. In one embodiment, each processing unit allocated is associated with a list of requests for first data that was allocated to it. When one or more new requests for first data for which the first data are not present in the cache memory are received, the load balancing module 302 must determine in which lists said new requests must be inserted. To do this, the load balancing module 302 injects metrics into the load balancing model corresponding to the processing of the predefined type. These metrics comprise the configuration parameters of the new requests corresponding to the processing of the predefined type, characteristics of the predefined processing as implemented by the elementary module 4X, characteristics of the second data to be processed, characteristics of the processing units allocated and, for each processing unit allocated, the configuration parameters corresponding to the processing of the predefined type of the request for first data already present in the list associated with said processing unit.

For example, for the encoding module 42, the configuration parameters of the new requests or of the requests already present in a list associated with one of the allocated processing units corresponding to the processing of the predefined type, that is to say corresponding to encoded data, comprise the following parameters; Codec_id, Codec_implementation_id, Video_profile, Video_level, Output_bitrate, Output_width, Output_Height, Output_FrameRate, Quality_Level, Segment_duration and GopSize. Characteristics of the encoding as implemented by the encoding module 42 comprise for example information indicating whether the implementation of the encoding comprises parallelisable processes and, if so, how many processes can be parallelised. Characteristics of the second data to be processed, that is to say data to be encoded for the encoding module 42, comprise for example the parameter Segment_complexity. Characteristics of the processing units allocated comprise for example a type of CPU, a type of virtual CPU, a CPU frequency, a number of cores in the CPU, a number of virtual CPUs and a RAM memory size.

The load balancing model then provides information representing a distribution of new requests for first data in the list associated with the processing units allocated. Each processing unit processes the requests for first data that were allocated to it in the order of appearance thereof in the lists associated with said processing unit. For each request for first data, the processing unit concerned awaits the reception of the second data corresponding to said first data requested during the step 704 in order to be able to apply the processing of the predefined type to said second data in order to obtain said first data. It should be noted that, in one embodiment, for each request for first data, the load balancing module interrogates the database 35 with the information representing the configuration parameters extracted from said request for first data by the extraction module 36 in order to obtain the configuration parameters corresponding to said request for first data.

The step 706 and the step 701 are followed by a step 707 during which, for each request for first data, the communication module 305 transmits the first data when they are available to the unit that sent the request for said first data. The unit that sent the request for said first data is either the terminal 1 (when the elementary module 4X implements the processing module 41) or an elementary module (when the elementary module 4X implements the processing module 42 or 43 or 44).

In one embodiment, the extraction module 36 extracts each item of information representing configuration parameters of each request for first data and stores this information in the database 35. Each processing unit in the plurality 31 that is to execute a processing operation interrogates the database 35 in order to obtain said information and next find the configuration parameters corresponding to this information. Each item of information representing configuration parameters thus stored forms part of the metrics supplied to the metric extraction module 7.

In one embodiment, the procedure for launching the workflow is executed by the CDN 2 or the server 3. In this case, for each segment, the terminal 1 transmits a request for example in accordance with the HLS protocol in order to obtain said segment and the CDN 2 or the server 3 translates this request into a request according to the invention as for example described in relation to the step 610.

In one embodiment, the procedure for launching the workflow is executed by the CDN 2 independently of any request of a terminal. In this embodiment, the CDN 2 anticipates future requests emanating from clients. The segments thus obtained are at least temporarily stored by the CDN 2.

In one embodiment, each processing unit in the plurality available for performing a processing of the predefined type corresponding to an elementary module 4X registers with a unit such as a server, referred to as a registration server, with which each elementary module can communicate using a communication network. In this case, for example at regular intervals, each elementary module interrogates the registration server in order to obtain the list of processing units that it could use. In this embodiment, as soon as an elementary module allocates a processing unit in the list stored by the registration server, it informs the registration server thereof, which deletes this processing unit from the list.

The invention claimed is:

1. A processing method executed by an elementary module executing a predefined type of processing in a workflow of at least one processing operation implemented by in a system for distributing an audiovisual content stored or produced live by a source to a display terminal, distributing said audiovisual content comprising distributing segments to said display terminal following a terminal request transmitted by said display terminal and resulting from an application of the workflow to a portion of said audiovisual content asked for by the terminal request and identified by an identifier, the method comprising:

receiving at least one first data request for first data, said first data request comprising (1) said identifier identifying said portion, (2) information representing the workflow of at least one processing operation to be applied to the portion of the audiovisual content asked for in the terminal request in order to obtain said first data, said information representing the workflow comprising for each processing operation an identifier composed of an address and a port number and (3) a configuration identifier and values of configuration parameters to be applied to said at least one processing operation for generating the first data;

extracting the information representing the configuration parameters contained in said first data request and transmitting a second data request for second data to a source or to a preceding elementary module determined from information representing the workflow, said second data corresponding to said portion of the audiovisual content identified by said identifier after being processed by said source or said preceding elementary module;

determining a number NU of processors to be allocated for executing said at least one processing operation of the workflow represented in the first request for first data received, said determining using a scaling model corresponding to the processing of the predefined type supplied by said system, each processor belonging to a plurality of processors available for executing the processing of the predefined type, the elementary module regularly obtaining information representing each processor added to or removed from said plurality, comparing the number NU with a number NAA of available processors already allocated and allocating a number of processors equal to NU-NAA in the case where NU>NAA or deallocating a number of processors equal to NAA-NU in the case where NU<NAA;

choosing at least one processor among the processors allocated using a load balancing model and activating each processor chosen so that it applies the predefined type of processing on the second data on reception of the second data, each processor taking into account the information representing the configuration parameters corresponding to the processing that it must execute, each scaling and load balancing model being a neural network of the deep learning type, trained during the functioning of said system from metrics obtained by said system, said metrics being supplied by each elementary module of said system executing the processing of the predefined type, said metrics representing a functioning of each elementary module of said system executing the processing of the predefined type; and, transmitting the first data when they are available; each processor not keeping any information concerning a processing once the processing has been performed wherein the elementary module, comprises circuitry configured to execute instructions.

2. The method according to claim 1, wherein the training of each scaling and load balancing models is performed asynchronously with respect to the functioning of each workflow comprising the elementary module.

3. The method according to claim 1, wherein the training of each scaling and load balancing model uses a set of characteristics taking the form of a parameter vector, some parameters being themselves vectors.

4. The method according to claim 3, wherein the set of characteristics used for the training of the scaling model comprises characteristics making it possible to adjust parameters of said scaling model in order to achieve an objective of avoiding overload of the processors allocated.

5. The method of claim 1, wherein each scaling and balancing model is a hybrid neural network wherein a neural network of the convolutional neural network type is followed by a neural network of the long short-term memory type, referred and then a neural network of the multilayer perceptron type.

6. A non-transitory storage medium, storing, a computer program comprising instructions for implementing, by a device, the method according to claim 1 when said program is executed by a processor of said device.

7. An elementary module configured to execute a predefined type of processing in a workflow of at least one processing operation implemented by in a system for distributing an audiovisual content stored or produced live by a source to a display terminal, distributing said audiovisual content comprising distributing segments to said display terminal following a terminal request transmitted by said display terminal and resulting from an application of the workflow to a portion of said audiovisual content asked for by the terminal request and identified by an identifier, the elementary module comprising at least one processor configured to:

receive at least one first data request for first data, said first data request comprising (1) said identifier identifying said portion, (2) information representing the workflow of at least one processing operation to be applied to the portion of the audiovisual content asked for in the terminal request in order to obtain said first data, said information representing the workflow comprising for each processing operation an identifier composed of an address and a port number and (3) a configuration identifier and values of configuration parameters to be applied to said at least one processing operation for generating the first data;

extract the information representing the configuration parameters contained in said first data request and transmitting a second data request for second data to a source or to a preceding elementary module determined from information representing the workflow, said second data corresponding to said portion of the audiovisual content identified by said identifier after being processed by said source or said preceding elementary module;

determine a number NU of processors to be allocated for executing said at least one processing operation of the workflow represented in the first request for first data received, said determining using a scaling model corresponding to the processing of the predefined type supplied by a modelling module included in said system, each processor belonging to a plurality of processors available for executing the processing of the predefined type, the elementary module regularly obtaining information representing each processor added to or removed from said plurality, compare the number NU with a number NAA of available processors already allocated and allocate a number of processors equal to NU-NAA in the case where NU>NAA or deallocate a number of processors equal to NAA-NU in the case where NU<NAA;

choose at least one processor among the processors allocated using a load balancing model supplied by the modelling module and activating each processor chosen so that it applies the predefined type of processing on the second data on reception of the second data, each processor taking into account the information representing the configuration parameters corresponding to the processing that it must execute, each scaling and load balancing model being a neural network of the deep learning type, trained by the modelling module during the functioning of said system from metrics obtained by a metrics aggregation module included in said system, said metrics being supplied by each elementary module of said system executing the processing of the predefined type, said metrics representing a functioning of each elementary module of said system executing the processing of the predefined type; and, transmitting the first data when they are available; each processor not keeping any information concerning a processing once the processing has been performed wherein the modelling module and metrics aggregation module are software, and wherein the elementary module comprises circuitry to execute instructions.

8. The elementary module of claim 1, wherein each scaling and balancing model is a hybrid neural network wherein a neural network of the convolutional neural network type is followed by a neural network of the long short-term memory type, referred and then a neural network of the multilayer perceptron type.

9. A system for distributing audiovisual contents stored or produced live by sources to display terminals, each content being received by a terminal in the form of a succession of consecutive segments, each segment being distributed to a terminal following a transmission of a request by said terminal and being obtained by an application of a workflow to a portion of a content wherein
- at least one workflow implemented by the distribution system comprises at least one elementary module according to claim 7 able to perform a processing of a predefined type of processing, and said system further comprises:
- the metrics aggregation module responsible for regularly obtaining metrics of each of the elementary modules of said system and, for each predefined type of processing, aggregating the metrics obtained of each processing module of said system implementing said predefined processing type; and
- the modelling module recovering the metrics specific to each predefined type of processing supplied by the metrics aggregation module and, from these metrics, defining, for each of said predefined type of processing, a scaling model and a load balancing model specific to said predefined type of processing.

10. The system according to claim 9, wherein the definition by training the scaling and load balancing models is performed asynchronously with respect to the functioning of each workflow comprising at least one elementary module used by said system.

* * * * *